C. G. ETTE.
BOLT AND NUT.
APPLICATION FILED JAN. 31, 1908.
919,840.
Patented Apr. 27, 1909.
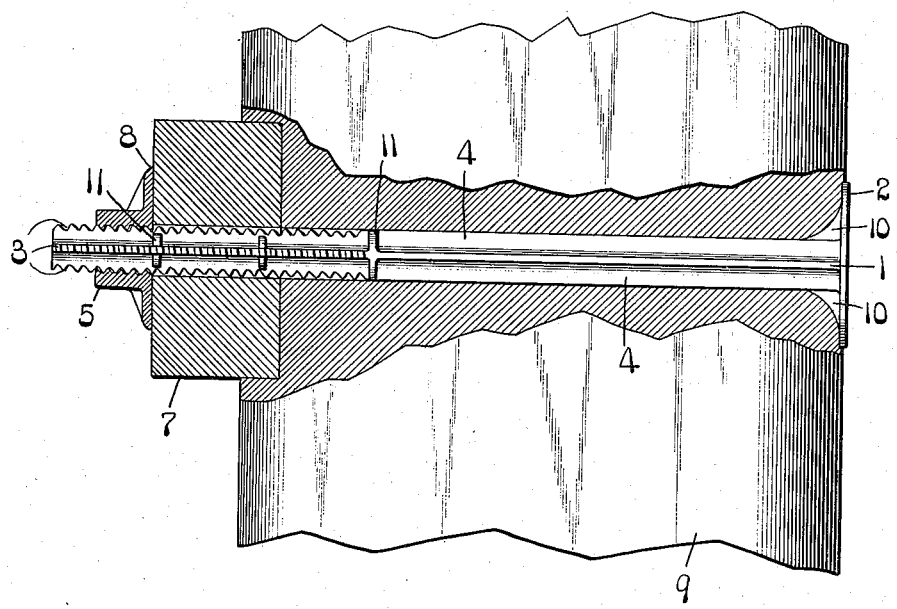
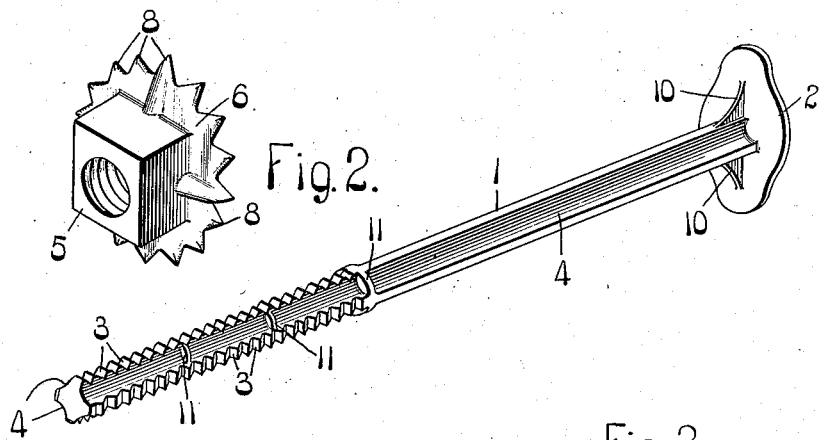
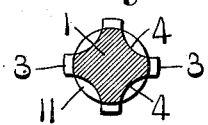
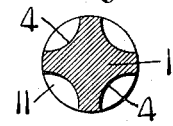
Witnesses
A. J. McCauley
Wells L. Church
Inventor:
Charles G. Ette
by Bakewell Cornwall
Attys.

UNITED STATES PATENT OFFICE.

CHARLES G. ETTE, OF ST. LOUIS, MISSOURI, ASSIGNOR TO ETTE INVESTMENT COMPANY, OF ST. LOUIS, MISSOURI, A CORPORATION OF MISSOURI.

BOLT AND NUT.

No. 919,840.  Specification of Letters Patent.  Patented April 27, 1909.

Application filed January 31, 1908. Serial No. 413,597.

*To all whom it may concern:*

Be it known that I, CHARLES G. ETTE, a citizen of the United States, residing at St. Louis, Missouri, have invented a certain new and useful Improvement in Bolts and Nuts, of which the following is a full, clear, and exact description, such as will enable others skilled in the art to which it appertains to make and use the same, reference being had to the accompanying drawings, forming part of this specification, in which—

Figure 1 is a side elevation of a portion of a telegraph pole showing my improved bolt and nut used for connecting a cross arm to said pole; Fig. 2 is a perspective view of my improved bolt and nut; Fig. 3 is a cross sectional view taken through the screw-threaded portion of the bolt; and Fig. 4 is a cross sectional view taken through the unthreaded portion of the shank of the bolt.

This invention relates to bolts, and has for its object to provide a bolt and nut of novel construction that are particularly adapted for connecting wooden cross arms to telegraph poles although it will, of course, be understood that my improved bolt and nut could be used for other purposes.

It has heretofore been the practice to connect cross arms to telegraph poles by means of ordinary round, forged bolts provided at one end with a head and at the opposite end with a screw-threaded portion on which a nut was mounted, washers being interposed between the cross arm and nut and between the head of the bolt and the pole through which the bolt extended. The threads on the bolt were comparatively fine so that a great deal of time was expended in screwing the nut down into position and also removing it from the bolt, and as the threads of the nut interlocked throughout their entire length with the threads of the bolt, a great deal of power was required to unscrew the nut if the bolt had rusted.

One serious objection to the use of ordinary bolts and nuts for connecting cross arms to poles is that a workman in replacing a cross arm which has broken or worn out, has to handle four parts for each fastening; namely, the bolt, nut and two washers. As the workman has to use one hand to retain his position on the pole while he is securing the cross arm in position, it is rather difficult to handle these four parts, two of which are comparatively small, and it is also difficult to unscrew the nut from the bolt if the bolt has become rusted.

As previously stated, the main object of my invention is to provide a bolt and nut that are particularly adapted for connecting cross arms to poles and to this end I have devised a bolt and nut which are so constructed that it will not be necessary to use washers with same, thereby reducing the number of parts which the workman has to handle when replacing a cross arm.

Another advantage of my improved bolt and nut is that the workman can use his fingers to run the nut down upon the bolt or off of the bolt, thus overcoming the necessity of using a wrench and also reducing the time required to connect the cross arm to the pole.

Another advantage of my improved construction is that the nut will not stick to the bolt even if the bolt has become rusted. And still another desirable feature of my improved nut and bolt is that they can be manufactured for about one-half the cost of manufacturing bolts and nuts of the type heretofore generally used for connecting cross arms to poles.

Referring to the drawings which illustrate the preferred form of my invention, 1 designates the shank of a bolt that is preferably made of malleable iron, and 2 designates a wide flat head on one end of said shank. The opposite end of the shank is provided with cast screw threads 3 that are formed during the operation of casting the shank and the shank is also provided with a plurality of longitudinal grooves 4 that preferably extend throughout the entire length of the shank, thereby producing a fluted bolt. The bolt is made of cast metal and the object of providing it with longitudinally extending grooves 4 is to obtain as much surface as possible for the heat to work on and thus permit the heat to penetrate to the center of the bolt during the operation of annealing the bolt. An annealed casting of this shape is also stronger than a cylindrical-shaped casting and comprises less metal so that the bolt can be produced at a low cost. The threads 3 on the bolt are very coarse and as the bolt is fluted said threads will afford a comparatively small bearing surface for the threads of the nut 5 that is screwed onto the bolt and thus prevent the nut from sticking to the bolt after it has rusted. The threads of the nut 5 loosely engage the threads of the bolt so that the workman can use his fingers to screw the nut down into position and also in running it off the bolt, a wrench or tool being required only to give the nut the last quarter turn and also to start it when it is being removed from the bolt.

The nut 5 is provided at its inner end with an integral laterally projecting flange 6 that affords a wide bearing surface for the nut on the cross arm 7 and thus overcomes the necessity of using a washer, and the flange 6 is provided with teeth 8, any one of which can be bent downwardly so as to sink into the cross arm and thus lock the nut in position. In removing the nut it is only necessary to give a quarter turn to same with a wrench or other tool, so as to disengage the tooth 8 that was bent downwardly into the cross arm, the workman thereafter using his fingers to run the nut off the bolt. As the head 2 of the bolt is wide it will not be necessary to interpose a washer between same and the pole 9 as has heretofore been the practice. To prevent the bolt from turning relatively to the pole I have provided the head 2 with wings or lugs 10 that sink into the pole when the bolt is driven into the opening that has been formed in the pole for same. This is a very desirable feature of my bolt as it overcomes the necessity of holding the bolt, while the nut is being screwed onto same or removed therefrom.

I prefer to form cross webs 11 in the grooves 4 of the bolt so as to prevent water from running down said grooves and thus rotting the pole 9 around the bolt.

Having thus described my invention, what I claim as new and desire to secure by Letters Patent is:

A metal bolt provided with longitudinally extending grooves that interrupt the screw-threads on same, and cross webs located in said grooves to prevent water from running down into said grooves; substantially as described.

In testimony whereof I hereunto affix my signature in the presence of two witnesses, this twenty-eighth day of January, 1908.

CHARLES G. ETTE.

Witnesses:
WALTER CLARENCE RAITHEL,
M. C. HAMMEL.